(12) United States Patent
Stiles

(10) Patent No.: US 6,211,809 B1
(45) Date of Patent: Apr. 3, 2001

(54) SURFACE-BASED PASSIVE MILLIMETER-WAVE LANDING AID

(75) Inventor: Gerald J. Stiles, El Segundo, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/145,359

(22) Filed: Sep. 1, 1998

(51) Int. Cl.[7] .................................................. G01S 13/88
(52) U.S. Cl. ............................... 342/33; 342/29; 342/52; 342/53; 342/55; 342/58; 342/60; 342/62; 342/66; 342/175; 342/176; 342/179; 348/113; 348/117; 348/121; 348/122; 348/123
(58) Field of Search ................................ 342/29, 33–36, 342/41, 53, 55, 58, 60–66, 175, 176, 179, 190, 191, 195; 340/815.4; 348/22, 113, 117, 121, 123, 122; 434/1, 2, 3, 4, 5

(56) References Cited

U.S. PATENT DOCUMENTS

| | | | |
|---|---|---|---|
| 3,080,556 | * | 3/1963 | Breithaupt ........................ 340/815.4 |
| 3,999,007 | * | 12/1976 | Crane ..................................... 348/123 |
| 4,910,523 | | 3/1990 | Huguenin et al. . |
| 4,940,986 | | 7/1990 | Hugenin . |
| 5,047,783 | | 9/1991 | Hugenin . |
| 5,202,692 | | 4/1993 | Huguenin et al. . |
| 5,438,336 | | 8/1995 | Lee et al. . |
| 5,530,247 | | 6/1996 | McIver et al. . |

* cited by examiner

*Primary Examiner*—Bernarr E. Gregory
(74) *Attorney, Agent, or Firm*—Michael S. Yatsko

(57) ABSTRACT

A passive millimeter-wave imaging system (10) that includes a millimeter-wave camera (12) positioned at the end of an aircraft landing strip (14) to provide an image (20) of the aircraft (16) approaching the landing strip (14) along a landing glidepath (18). The camera (12) broadcasts the image (20) of the aircraft (16) approaching the landing strip (14) to the aircraft (16) and to a control tower (24). With this information, the pilot of the aircraft (16) sees his aircraft's position relative to the glidepath (18), and can make landing adjustments accordingly. Likewise, the tower personnel can monitor the aircraft landing glidepath (18) to insure that the aircraft (16) maintain a safe distance relative to the ground. In one embodiment, a closed-loop communication is provided between the aircraft (16) and the camera (12), where the aircraft (16) transmits a signal to the camera (12) that is combined with the image (20) to give the pilot an indication of which aircraft (16) in the image (20) is his aircraft (16). The coded signal transmitted by the aircraft (16) can also be used to give a range of the aircraft (16) from the landing strip (14).

37 Claims, 2 Drawing Sheets

SURFACE-BASED PASSIVE MILLIMETER-WAVE LANDING AID

BACKGROUND OF THE INVENTION

1. Field of the Invention

This invention relates generally to a passive millimeter-wave aircraft imaging and landing system and, more particularly, to an aircraft landing system incorporating a passive millimeter-wave camera positioned on the ground relative to the aircraft landing strip to provide an image of the airplanes approaching the landing strip, and to transmit signals of the image to the aircraft and the control tower.

2. Discussion of the Related Art

Different guidance systems are known in the art for directing aircraft along a glidepath to a runway for landing. Certain weather conditions, such as clouds, rain, fog, smoke, etc., decrease or completely prevent the pilot of the aircraft from visualizing the runway and to monitor the aircraft's approach along the landing glidepath. The type of guidance system, and the number of backup guidance systems for redundancy purposes, determines the various weather standards the particular aircraft can land in, and the aircrafts lowest safe position relative to the ground. Certain known guidance systems allow the aircraft to land in varying degrees of degraded weather conditions, and levels of redundancy of back-up guidance systems even allow the aircraft to land in zero visibility conditions.

One type of aircraft landing system known in the art uses a ground control approach including a radar system having scanning antennas located near the runway that scan the aircraft approach path in both azimuth and elevation. Reflected radar waves from the aircraft are detected and displayed on a monitor in a control facility in both the elevation and azimuth relative to the desired landing path. From this display, a ground controller instructs the pilot of the aircraft by voice transmissions of the aircraft's position relative to the desired glide path to allow the pilots to adjust the aircraft position for a proper landing. Although generally successful, radar based systems are limited in extremely low visibility conditions, and require essentially continuous access to a voice communications channel for communication between a control facility and the pilot.

An instrument landing system (ILS) is another type of known controlled approach aircraft landing system that includes antennas positioned near the runway that radiate localizer and glidepath beams to provide left-right and up-down guidance direction. Receivers in the aircraft receive and convert the localizer and glidepath beams into signals that define vertical and horizontal pointers that provide an indication of the aircraft's position relative to the desired landing path. Pointer deflection from a center position indicates the direction in which the pilot must fly the aircraft to the desired landing path. Current ILS that include triple redundancy allow the aircraft to land in zero visibility conditions.

Another controlled landing technique known in the art utilizes a microwave landing system that provides a number of acceptable landing paths. The microwave landing system also uses antennas positioned near the runway that scan the aircraft approach region, and microwave receiving equipment in the aircraft for decoding the transmitted information and converting it into an instrument display. This displayed image is significantly different from what the pilot sees when making a visual approach.

Millimeter-wave imaging systems that generate images of a scene by detecting millimeter-wave radiation (30–300 GHz) offer significant advantages over other types of imaging systems that provide imaging by detecting visible light, infrared radiation, microwave radiation, etc. These advantages generally relate to the fact that millimeter-wave radiation can penetrate low visibility and obscured atmospheric conditions caused by many factors, such as clouds, fog, haze, rain, dust, smoke, sandstorms, etc., without significant attenuation, as would occur with other types of radiation mentioned above. More particularly, certain propagation frequency windows in the millimeter-wave length spectrum, such as W-band wavelengths at about 89–94 GHz, is not significantly absorbed by the atmosphere.

Millimeter-wave imaging systems that use a focal plane imaging array to detect the millimeter-wave radiation and image a scene are known in the art. In these types of systems, the individual receivers that make up the array each include its own millimeter-wave antenna and detector. An array interface multiplexer is provided that multiplexes the electrical signals from each of the receivers to a processing system. A millimeter-wave focal plane imaging array of this type is disclosed in U.S. Pat. No. 5,438,336 issued to Lee et al. titled "Focal plane Imaging Array With Internal Calibration Source." In this patent, an optical lens focuses millimeter-wave radiation collected from a scene onto an array of pixel element receivers positioned in the focal plane of the lens. Each pixel element receiver includes an antenna that receives the millimeter-wave radiation, a low noise amplifier that amplifies the received millimeter-wave signal, a bandpass filter that filters the received signal to only pass millimeter-wave radiation of a predetermined wavelength, and a diode integration detector that detects the millimeter-wave radiation and generates an electrical signal therefrom. The signal from each of the diode detectors is then sent to an array interface unit that multiplexes the electrical signals to a central processing unit to be displayed on a suitable display unit. Each pixel element receiver includes a calibration circuit to provide a background reference signal to the detector. Other types of focal plane imaging arrays include separate detecting pixel elements are also known in the art.

Active millimeter-wave aircraft landing systems are known in the art. U.S. Pat. No. 4,940,986 discloses one such landing system for low visibility conditions. The system includes providing a number of millimeter-wave sources at or near the runway that radiate millimeter-wave beams along the runway. A millimeter-wave camera positioned on the aircraft receives the millimeter-wave radiation to create an image of the millimeter-wave sources corresponding to the landing runway.

Passive millimeter-wave landing systems are also known in the art that are able to generate an image of the aircraft landing area in low visibility conditions without the need to provide millimeter-wave radiation sources. In the known passive millimeter-wave landing systems, the millimeter-wave camera is also positioned on the aircraft, and provides an image of the scene at the landing area. However, because of the particular wavelengths and resolution requirements of such a system, the antenna associated with the passive millimeter-wave landing systems are significantly large, and the entire system is space intensive. Therefore, the size of the aircraft limits its ability to carry the known passive millimeter-wave landing hardware. Smaller aircraft generally are not able to carry such equipment.

It is anticipated that future, adverse weather, precision landing systems will be based on the global positioning satellite (GPS) system. Currently, an experimental use of a GPS system is being used on commercial airlines, but this use is limited to fair weather conditions. GPS systems are well known positioning systems based on satellite detection of high frequency signals that give the precise location of the receiver. In this type of system, GPS receivers will give the exact location of an aircraft, relative to a landing runway and/or other aircraft in the area. Fundamentally, the GPS precision landing system will be used to provide glidepaths for pilots to follow for landings at airports throughout the world.

This anticipated GPS precision landing system is a "single thread" system in that it lacks a redundant backup. Also, current GPS systems are unreliable because random errors are experienced that could lead to landing accidents if the system were used alone for these types of landings. Thus, some form of redundancy is desired to augment the anticipated GPS landing systems.

It is an object of the present invention to provide a passive millimeter-wave imaging system as part of an aircraft landing system that has a particular application as a backup to a GPS landing system and does not suffer from some of the drawbacks mentioned above.

SUMMARY OF THE INVENTION

In accordance with the teachings of the present invention, a passive millimeter-wave imaging system is disclosed that includes a millimeter-wave camera unit positioned relative to an aircraft landing strip to provide an image of the aircraft approaching the landing strip along a landing glidepath. The camera unit broadcasts the image of the aircraft approaching the landing strip to the aircraft and to a control tower. With this information, the pilot of the aircraft can see his aircraft's position relative to the glidepath, and make landing adjustments accordingly. Likewise, the tower personnel can monitor the aircraft landing glidepath to insure that the aircraft maintain a safe distance relative to the ground. In one embodiment, a closed-loop communication is provided between the aircraft and the camera unit, where the aircraft transmits a coded signal received by the camera unit that is combined with the image to give the pilot an indication of which aircraft in the image is his aircraft. The coded signal transmitted by the aircraft can also be used to give a range of the aircraft from the landing strip.

Additional objects, advantages, and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to a passive millimeter-wave imaging system used as an aircraft landing aid is merely exemplary in nature, and is in no way intended to limit the invention or its applications or uses. For example, the passive millimeter-wave imaging system described below is used to image the glidepath of aircraft landing on a landing strip. However, the system of the invention has other uses for imaging aircraft relative to each other, and the ground, as well as other imaging capabilities.

Figure 1:
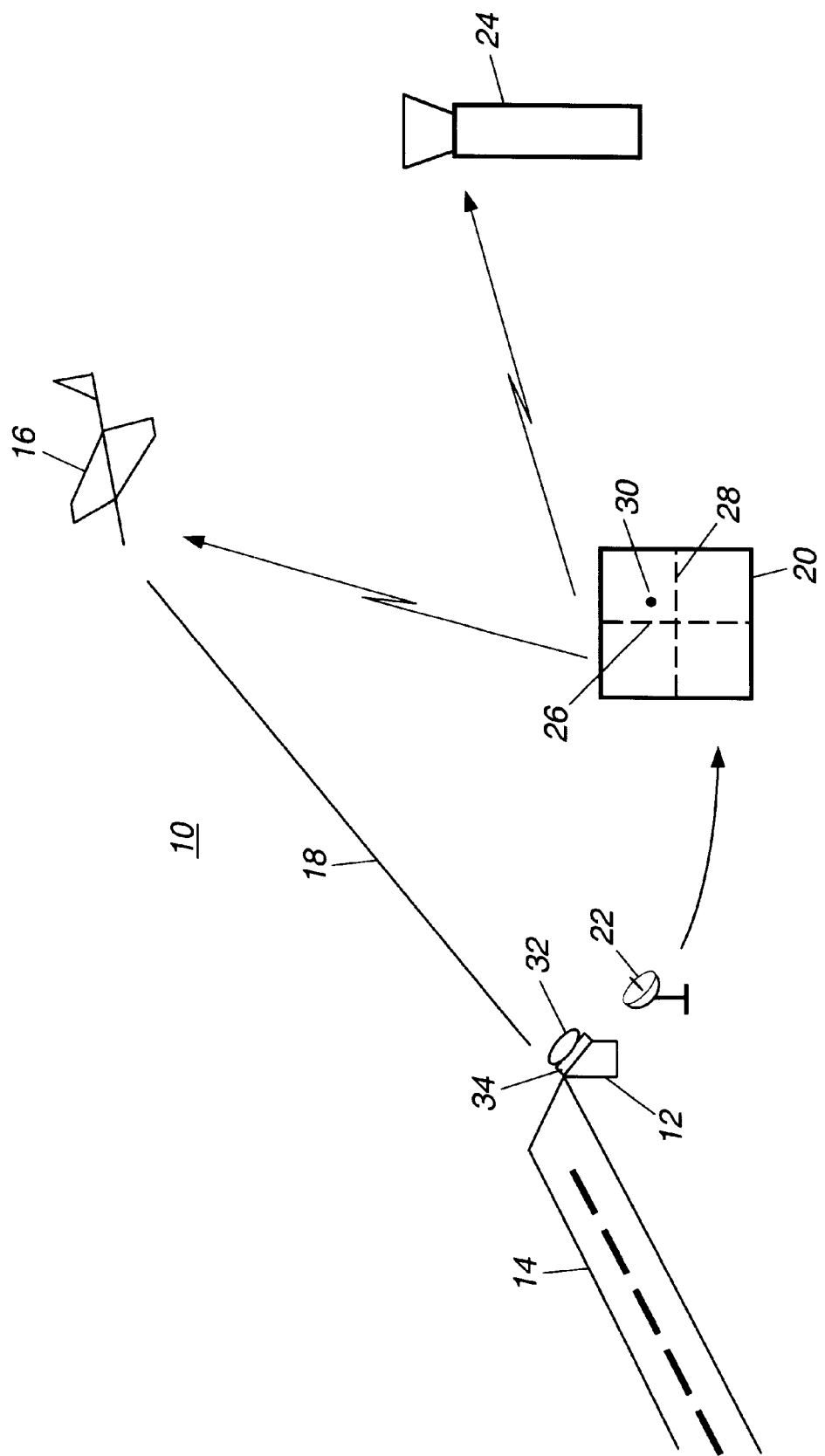
FIG. 1 is a plan view of a surface-based passive millimeter-wave landing system, according to the invention.

FIG. 1 shows a general plan view of a surface-based passive millimeter-wave landing system 10, according to the invention. The system 10 includes a millimeter-wave camera 12 positioned at the approach end of a runway 14. An aircraft 16 is shown flying along a glidepath 18 towards the runway 14 for landing. The aircraft 16 can be one of a series of multiple aircraft (not shown) flying along the glidepath 18 to the runway 14, where the aircraft are spaced apart from each other and the ground to follow the glidepath 18 for a safe landing on the runway 14 in accordance with a landing scheme of a particular airport, as would be well understood to those skilled in the art. Each aircraft may or may not be equipped with the hardware necessary to be used with the landing system 10. For most landing schemes, the glidepath 18 has a 3° glide slope. The camera 12 generates an image 20 of the glidepath 18 and the approaching aircraft positioned along the glidepath 18. An antenna 22 transmits the image 20 to the aircraft 16 and an airport traffic control tower 24. The aircraft 16 and the control tower 24 include suitable receivers and display components to receive and display the image. As is well understood in the art, the control tower 24 is manned with control personnel that control the spacing of the aircraft 16 around the airport.

In one embodiment, the image 20 generated by the camera 12 is combined with reference indicia, such as a vertical alignment line 26 and a horizontal alignment line 28. The lines 26 and 28 define the glidepath 18 at an intersection thereof. An image blip 30 shows the position of the aircraft 16 on the image 20 relative to the lines 26 and 28. The image 20 is viewed by the pilots of the aircraft 16 and the personnel in the control tower 24, so that the position of the blip 30 gives the pilot of the aircraft 16 the aircraft's position relative to the glidepath 18 to allow the pilot to make appropriate adjustments, if necessary, for landing purposes. Here, the aircraft 16 is offset from the glidepath 18, requiring the pilot to make suitable landing corrections.

In this embodiment, the camera 12 is a single camera located at the end of the runway 14, as mentioned above. However, in alternate embodiments, the camera 12 can be positioned at a suitable location relative to the runway 14 to provide the image 20 of the glidepath 18. The camera 12 can be positioned at a location spaced apart from the runway 14, or any suitable location where the camera 12 does not interfere with the landing aircraft 16. In a specific embodiment, the camera 12 can be embedded within the ground in front of the runway 14, or within the runway 14 so that it doesn't extend above ground level.

The camera 12 includes a lens 32 and a receiver unit 34. In one embodiment, the receiver unit 34 includes a plurality of sensor cards (not shown) that have a plurality of millimeter-wave monolithic integrated circuit (MMIC) receiver modules, where each receiver module includes a plurality of separate MMIC pixel element receivers. The combination of all of the pixel element receivers define a millimeter-wave focal plane imaging array, such as the type disclosed in the '336 patent mentioned above. Millimeter-wave arrays of this type are known in the art, and the camera 12 would include enough pixel elements appropriately configured to provide the desired resolution at the desired distance from the runway 14, as would be appreciated by those skilled in the art. Any suitable millimeter-wave imaging array for the purposes described herein can be used by the camera 12.

The image 20 transmitted to the aircraft 16 and the control tower 24 would be displayed on a suitable display to be viewed by the pilot and control tower personnel, and would provide an image of the aircraft 16 through all types of weather conditions. The image 20 can be broadcast to the aircraft 16 and the control tower 24 by any suitable existing or perceived data link transmission for aircraft communications. Certain aircraft transmission schemes can incorporate the transmitted image 20 in a time sharing fashion along with other transmitted information. In a particular embodiment, the transmission of the image 20 from the camera 12 to the aircraft 16 and the control tower 24 can be provided by transmitting the data at millimeter-wave frequencies. Alternately, the transmission of the image 20 from the camera 12 to the control tower 24 can be hard wired by coaxial cables (not shown).

In one embodiment, the aircraft 16 can send a coded transmission signal to the camera 12 that identifies the aircraft 16 in the image 20, so the pilot knows whether he is looking at himself on the image 20 or another aircraft. In other words, because there may be multiple aircraft travelling along the glidepath 18 towards the runway 14 at any given time, by transmitting a coded signal from the aircraft 16 that is unique to the coded signals transmitted by other aircraft, each aircraft can be separately identified. The camera 12 will detect the coded signal and will combine the detected signal with the transmitted image. Such a scheme would prevent the pilot from making adjustments of his aircraft relative to the glidepath 18 because he was unsure of which aircraft in the image 20 was his. Additionally, the transmissions back and forth between the aircraft 16 and the camera 12 can provide range information of the distance the aircraft 16 is from the runway 14.

Figure 2:
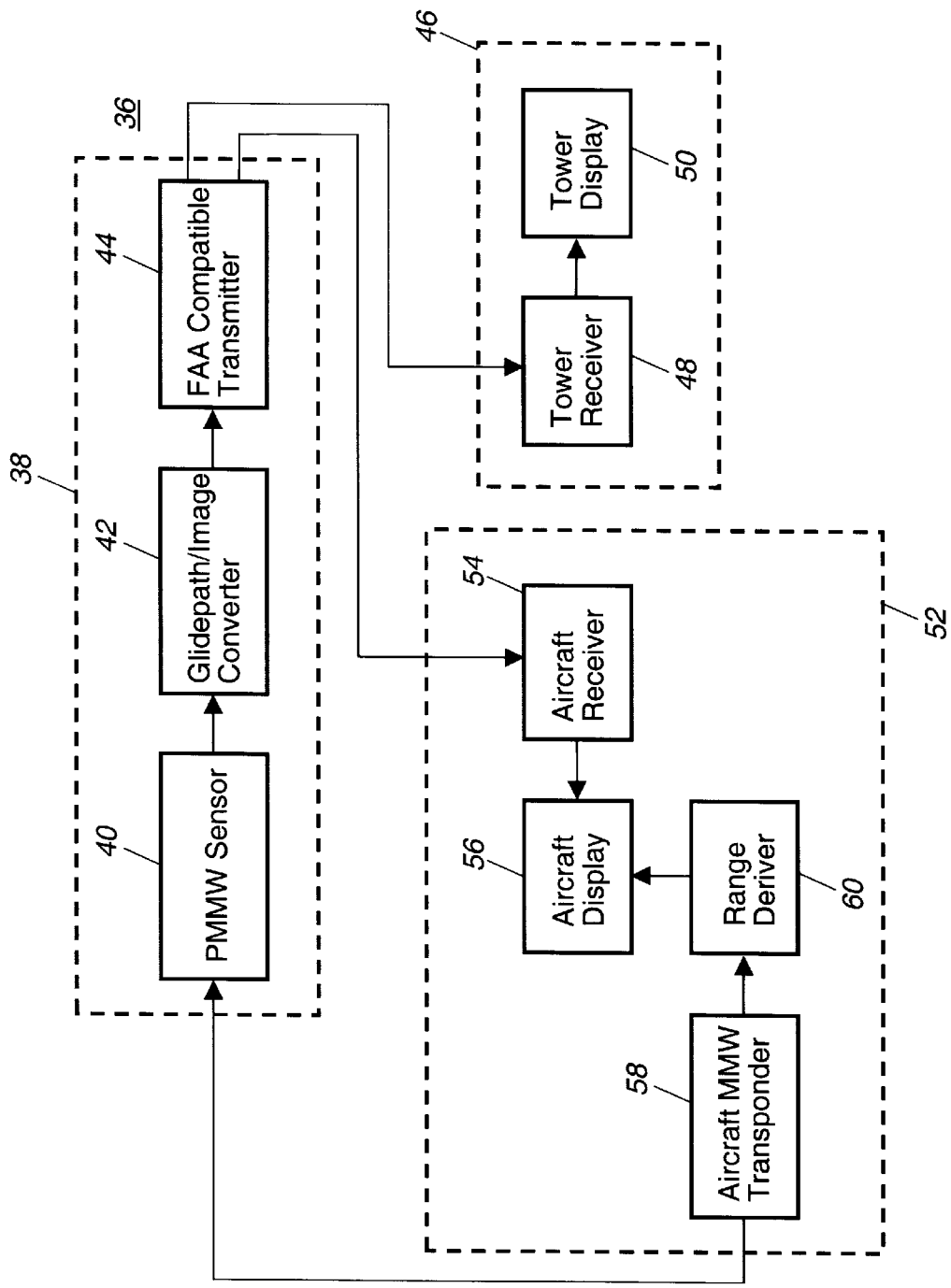
FIG. 2 is a block diagram showing the operation of the landing system of the invention.

FIG. 2 shows a block diagram 36 depicting the operation of the landing system 10 discussed above. A camera unit 38 includes a millimeter-wave sensor 40, representing the camera 12, that images the aircraft 16 travelling along the glidepath 18. This image is combined with reference indicia, such as the lines 26 and 28, by a suitable image converter 42. The combined image is then transmitted by an FAA compatible transmitter 44 to a control tower suite 46, representing the control tower 24. The image can be transmitted by a suitable frequency transmission, or by cables connected from the camera unit 38 to the tower suite 46. The transmitter 44 can be any suitable transmitter for the purposes described herein. The tower suite 46 includes a control tower receiver 48 that receives the transmitted image and a control tower display 50 that is suitable to display the millimeter-wave image to be viewed by control tower personnel.

The combined image is also transmitted to an aircraft suite 52, representing the aircraft 16. The aircraft suite 52 includes a suitable receiver 54 that receives the image and an aircraft display 56 that displays the image in the aircraft suite 52. The image can be transmitted to the aircraft suite 52 by any appropriate or suitable transmission scheme, including millimeter-wave frequency transmissions or an existing aircraft communication link. In an optional embodiment, the aircraft suite 52 includes an aircraft MMW transponder 58 that transmits a coded millimeter-wave frequency signal that is received by the sensor 40. The signal is combined with the image transmitted by the transmitter 44 and received by the aircraft receiver 54 so that the signal is displayed on the aircraft display 56. The signal is unique to the particular aircraft suite 52, and gives an indication of which aircraft represents the aircraft suite 52 in the image. Also, in an optional embodiment, the coded signal is sent to a range deriver 60 and the signal received by the receiver 54 is also sent to the range deriver 60. The range deriver 60 provides the range of the aircraft suite 52 from the runway 14 based on the transmission time of the signal from the transponder 58. Also, the camera unit 38 can include some type of range interrogator to provide the range based on the transponder signal to the control tower suite 46.

The foregoing discussion discloses and describes merely exemplary embodiments of the present invention. One skilled in the art will readily recognize from such discussion, and from the accompanying drawings and claims, that various, changes, modifications and variations can be made therein without departing from the spirit and scope of the invention as defined in the following claims.

What is claimed is:

1. A surface-based aircraft landing system comprising:
    an aircraft landing runway;
    at least one aircraft flying along an aircraft glidepath towards the runway for landing; and
    at least one camera unit positioned on the ground relative to the runway,
    at least one camera unit positioned on the ground relative to the runway, said camera unit being directed towards the aircraft glide path and generating an image of a scene including the glidepath and the aircraft, said camera unit transmitting the image to the aircraft that is displayed in the aircraft to allow a pilot of the aircraft to view the aircraft as it approaches the runway.

2. The system according to claim 1 further comprising a control tower, said camera unit transmitting the image of the glidepath to the control tower that is displayed in the control tower.

3. The system according to claim 1 wherein the camera unit further includes an image converter that combines the image with glidepath reference indicia.

4. The system according to claim 3 wherein the combined image includes reference lines identifying the glidepath.

5. The system according to claim 1 wherein the camera unit includes a passive millimeter-wave sensor that images the scene by detecting millimeter-wave radiation.

6. The system according to claim 1 wherein the camera unit is embedded in the ground.

7. The system according to claim 1 wherein the camera unit broadcasts the image to the aircraft at millimeter-wave frequencies.

8. The system according to claim 1 wherein the at least one aircraft includes a transmitter that transmits a coded signal that is received by the camera unit and is included in the image to identify the aircraft.

9. The system according to claim 8 wherein the at least one aircraft includes a range deriver that determines the distance of the aircraft from the runway based on the transmission time of the coded signal.

10. The system according to claim 8 wherein the transmitter transmits a millimeter-wave coded signal.

11. A surface-based aircraft communications system comprising:
    at least one aircraft flying through an aircraft traffic location in the sky; and
    at least one camera unit positioned on the ground relative to the aircraft traffic location said camera unit being directed towards the aircraft in the aircraft traffic location and generating an image of the sky including the aircraft traffic location and the at least one aircraft, said camera unit transmitting the image to the aircraft that is displayed in the aircraft to allow a pilot of the aircraft to view the aircraft as it travels through the traffic location.

12. The system according to claim 11 wherein the camera unit further includes an image converter that combines the image with reference indicia.

13. The system according to claim 11 wherein the camera unit includes a passive millimeter-wave sensor that images the scene by detecting millimeter-wave radiation.

14. The system according to claim 11 wherein the at least one aircraft includes a transmitter that transmits a coded signal that is received by the camera unit and is included in the image to identify the aircraft.

15. The system according to claim 11 wherein the camera unit broadcasts the image to the aircraft at millimeter-wave frequencies.

16. A surface-based passive millimeter-wave landing system for guiding aircraft, said system comprising:
   a control tower;
   an aircraft landing runway;
   at least one aircraft flying along an aircraft glidepath towards the runway for landing; and
   a camera unit positioned on the ground relative to the runway, said camera unit including a millimeter-wave sensor that is directed towards the aircraft glide path and detects millimeter-wave radiation from a scene including the glidepath, said camera unit further including an image converter that combines the image with glidepath reference indicia and a transmitter that transmits the combined image to the control tower and the aircraft that is displayed in the aircraft and in the control tower so that a pilot of the aircraft and control tower personnel view the aircraft as it approaches the runway.

17. The system according to claim 16 wherein the combined image includes reference lines identifying the glidepath.

18. The system according to claim 16 wherein the camera unit is embedded in the ground relative to the runway.

19. The system according to claim 16 wherein the camera unit transmits the image to the aircraft at millimeter-wave frequencies.

20. The system according to claim 16 wherein the at least one aircraft includes a transmitter that transmits a coded signal that is received by the sensor and is included in the image to identify the aircraft.

21. The system according to claim 20 wherein the at least one aircraft includes a range deriver that determines the range of the aircraft from the runway based on the transmission time of the coded signal.

22. A method of controlling the flight of an aircraft, said method comprising the steps of:
   directing a millimeter-wave camera unit towards an aircraft traffic location occupied by at least one aircraft;
   detecting millimeter-wave radiation from the sky at the aircraft traffic location occupied by the at least one aircraft;
   generating an image of the sky from the detected millimeter-wave radiation including the aircraft; and
   transmitting the image to the at least one aircraft flying through the aircraft traffic location that is displayed in the aircraft.

23. The method according to claim 22 wherein the step of detecting includes detecting millimeter-wave radiation on a glidepath to a runway.

24. The method according to claim 22 wherein the step of transmitting the image also includes transmitting the image to a control tower.

25. The method according to claim 22 wherein the step of generating an image includes generating an image including reference indicia of the aircraft traffic location.

26. The method according to claim 22 wherein the step of transmitting the image includes transmitting the image at millimeter-wave frequencies.

27. The method according to claim 22 further comprising the step of transmitting a coded signal from the aircraft to camera unit that detects the millimeter-wave radiation.

28. The method according to claim 27 further comprising the step of determining the range of the aircraft from the camera unit based on the transmission time of the coded signal from the aircraft.

29. The method according to claim 27 wherein the step of transmitting a coded signal includes transmitting a coded signal at millimeter-wave frequencies.

30. A surface-based aircraft landing system comprising:
   an aircraft landing runway;
   at least one aircraft flying along an aircraft glidepath towards the runway for landing; and
   at least one camera unit positioned on the ground relative to the runway and generating an image of a scene including the glidepath and the aircraft, said camera unit transmitting the image to the aircraft that is displayed in the aircraft to allow a pilot of the aircraft to view the aircraft as it approaches the runway, wherein the at least one aircraft includes a transmitter that transmits a coded signal as received with a camera unit and is included in the image to identify the aircraft.

31. The system according to claim 30 wherein the at least one aircraft includes a range deriver that determines the distance of the aircraft from the runway based on the transmission time of the coded signal.

32. The system according to claim 30 wherein the transmitter transmits a millimeter-wave coded signal.

33. A surface-based aircraft communications system comprising:
   at least one aircraft flying through an aircraft traffic location in the sky; and
   at least one camera unit positioned on the ground relative to the aircraft traffic location and generating an image of the sky including the aircraft traffic location and the at least one aircraft, said camera unit transmitting the image to the aircraft that is displayed in the aircraft to allow a pilot of the aircraft to view the aircraft as it travels through the traffic location, said at least one aircraft including a transmitter that transmits a coded signal that is received by the camera unit and is included in the image to identify the aircraft.

34. A surface-based aircraft communications system comprising:
   at least one aircraft flying through an aircraft traffic location in the sky; and
   at least one camera unit positioned on the ground relative to the aircraft traffic location and generating an image of the sky including the aircraft traffic location and the at least one aircraft, said camera unit transmitting the image to the aircraft that is displayed in the aircraft to allow a pilot of the aircraft to view the aircraft as it travels through the traffic location, wherein the camera unit broadcasts the image to the aircraft at millimeter-wave frequencies.

35. A method of controlling the flight of an aircraft, said method comprising the steps of:
   detecting millimeter-wave radiation from the sky at an aircraft traffic location occupied by the aircraft;
   generating an image of the sky from the detected millimeter-wave radiation including the aircraft;
   transmitting the image to the at least one aircraft flying through the aircraft traffic location that is displayed in the aircraft; and
   transmitting a coded signal from the aircraft to a camera unit that detects the millimeter wave radiation.

36. The method according to claim 35 further comprising the step of determining the range of the aircraft from the camera unit based on the transmission time of the coded signal from the aircraft.

37. The method according to claim 35 wherein the step of transmitting a coded signal includes transmitting a coded signal at millimeter-wave frequencies.

* * * * *